United States Patent

[11] 3,633,117

| | | |
|---|---|---|
| [72] | Inventor | Robert A. Reilly, Jr.<br>North Caldwell, N.J. |
| [21] | Appl. No. | 59,218 |
| [22] | Filed | July 29, 1970 |
| [45] | Patented | Jan. 4, 1972 |
| [73] | Assignee | International Telephone and Telegraph Corporation<br>Nutley, N.J. |

[54] SUPPRESSION OF A PHASE-SENSITIVE SPECTRAL COMPONENT FROM A SIGNAL
4 Claims, 1 Drawing Fig.

[52] U.S. Cl. .................................................... 328/166,
307/232, 324/83 Q, 328/109, 328/139, 330/149, 332/18
[51] Int. Cl. ..................................................... H03b 1/04
[50] Field of Search ........................................ 328/166, 165, 139, 109; 307/232, 233; 333/70 A, 70 R; 324/83 Q, 83 FE; 332/18; 330/149

[56] References Cited
UNITED STATES PATENTS

| | | | |
|---|---|---|---|
| 3,355,668 | 11/1967 | Boensel et al. ................. | 328/166 X |
| 3,377,557 | 4/1968 | Heibel ........................... | 324/83 Q |
| 3,414,823 | 12/1968 | Knox ............................. | 328/166 X |
| 3,353,147 | 11/1967 | Meeker, Jr. ................... | 328/165 X |

Primary Examiner—Stanley T. Krawczewicz
Attorneys—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

ABSTRACT: A method and apparatus for suppressing a phase-sensitive spectral component from a given signal. A phase and amplitude-sensitive blocking pulse is generated at the frequency of the spectral component. This blocking pulse is subtracted from the signal and the unsuppressed portion of the spectral component is used to adjust the phase and amplitude of the blocking pulse, so as to more completely eliminate the spectral component from the signal.

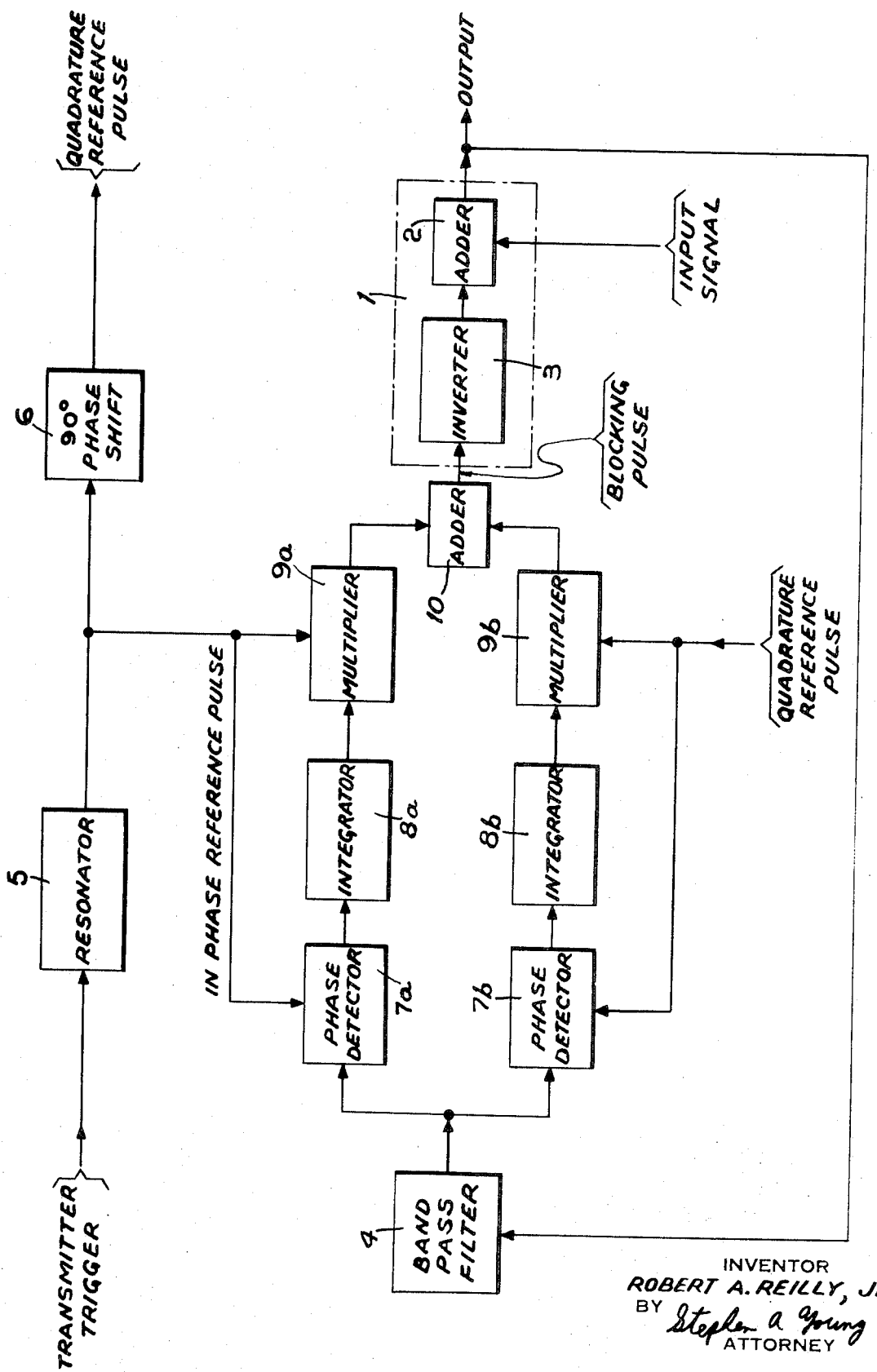

SUPPRESSION OF A PHASE-SENSITIVE SPECTRAL COMPONENT FROM A SIGNAL

BACKGROUND OF THE INVENTION

This invention relates to a method and apparatus for suppressing a phase-sensitive spectral component from a signal.

Very often during the course of transmission of a signal having a particular bandwidth, it is necessary to eliminate from the signal all components within a desired band since these components may cause severe problems and interfere with the performance of the overall system. Therefore, it becomes necessary to eliminate or suppress certain spectral components from this signal. It has been found that one cannot simply generate this spectral component and subtract it from the signal since this generated component, in all probability, is not equal in amplitude and phase to the existing spectral component of the signal, and therefore simple subtraction of the generated spectral component from the signal will not satisfactorily eliminate the desired spectral component from the signal.

SUMMARY OF THE INVENTION

It is therefore an object of this invention to suppress a spectral component from the signal.

It is a further object to generate a blocking pulse equal in amplitude and in phase to the spectral component of the signal so as to more completely eliminate or suppress the spectral component from the signal.

According to a broad aspect of the invention there is provided an apparatus for suppressing a phase-sensitive spectral component from a signal-comprising means for generating an amplitude- and phase-sensitive blocking pulse at the frequency of said spectral component, means for subtracting said blocking pulse from said signal, means for coupling the remainder of said signal to said generating means, so as to readjust the amplitude and phase of said blocking pulse in order to more completely eliminate said spectral component from said signal.

In a feature of this invention, said generating means further provides means for filtering said phase-sensitive spectral component from said signal, means for generating first and second reference pulses at the frequency of said spectral component, said second reference pulse being in phase quadrature with said first reference pulse, means coupled to said first and second reference pulses and said filtered spectral component for converting said filtered spectral component into respective first and second phase quadrature error signals, first and second means for multiplying the respective first and second reference pulses by a factor varying between 0 and 1, the factor of each of said first and second multiplying means being determined by said respective first and second phase quadrature error signals, and means for summing the multiplied first and second reference pulses to obtain said blocking pulse at the frequency of said spectral component.

According to another aspect of the invention there is provided a method of suppressing a phase-sensitive spectral component from a signal comprising the steps of generating a phase- and amplitude-sensitive blocking pulse at the frequency of said spectral component, subtracting said blocking pulse from said signal, and readjusting the phase and amplitude of said blocking pulse with the use of the unsuppressed portion of said spectral component so as to more completely eliminate said spectral component from said signal.

In another feature of this invention, the blocking pulse is generated by filtering said phase-sensitive spectral component from said signal, generating first and second pulses at the frequency of said spectral component, said second reference pulse being in phase quadrature with said first reference pulse, converting said filtered spectral component into respective first and second phase quadrature error signals, multiplying the respective first and second reference pulses by a factor varying between 0 and 1, the multiplying factor for each of said first and second reference pulses being determined by said respective first and second phase quadrature error signals, and summing the multiplied first and second reference pulses to obtain said blocking pulse at the frequency of said spectral component.

BRIEF DESCRIPTION OF THE DRAWINGS

The FIGURE shows a block diagram of the apparatus for performing the objects of this invention.

DESCRIPTION OF THE PREFERRED EMBODIMENTS

By way of example, the apparatus shown in the FIGURE is used to suppress a spectral component from a Loran C pulse so that the final transmitted Loran C pulse will not contain that spectral component. Loran C systems are generally described in Jansky and Bailey, Inc. "The Loran C System of Navigation," Report to U.S. Coast Guard, Feb. 1962; and R. A. Reilly, "Microminiature Loran C Receiver/Indicator," IEEE Transactions on Aerospace and Electronic systems, Volume AES-2, No. 1, Pages 74–88, Jan. 1966.

The generated Loran C pulse is the input signal which is applied to the subtracting network 1. The Loran C pulse has a center frequency of 100 KHz., a 20 KHz. bandwidth, spectral components within the 90–110KHz. range. We will attempt to eliminate a spectral component at the center frequency of 109.6 KHz. having a narrow bandwidth of approximately 200 Hz. The Loran C signal is generally produced at a repetition rate of 1 millisecond by a 1 microsecond transmitter trigger pulse applied to a 3-pole band pass filter having a center frequency of 100 KHz.

This input signal, as previously mentioned, is introduced into subtracting network 1 at adder 2. Adder 2 may be simply a resistor network for adding the input signal and signals from the output of inverter 3. Inverter 3 may simply be a standard amplifier. Initially, since no blocking pulse is introduced into inverter 3, the signal at the output of adder 2 is equal to the input signal. This input signal is fed back to band pass filter 4. Band pass filter 4 will have a center frequency of the desired spectral component, i.e., 109.6 kHz. and a narrow bandwidth of approximately 200 Hz.

The same trigger pulse used to generate the input signal is also passed into a resonator 5. Resonator 5 is a similar 3-pole band pass filter to the 3-pole band pass filter used to generate the input signal. However, the output of resonator 5 is a narrow pulse having a center frequency of the spectral component, i.e., 109.6 KHz. with a narrow bandwidth of approximately 200 Hz. However, as previously mentioned, the output of the resonator 5 does not produce the exact spectral component to be eliminated from the generated input signal due to physical differences in the respective 3-pole band pass filters used to generate the input signal and the output from resonator 5.

The output of resonator 5 is fed into a 90° phase-shifting network 6 wherein the output of the phase-shifting network is in phase quadrature with the input to the phase-shift network 6. The output of resonator 5 will be referred to as the in-phase reference pulse and the output of phase-shift network 6 will be referred to as the quadrature reference pulse.

The spectral component at the output of band pass filter 4 is fed into synchronous (phase) detectors 7a and 7b. The in-phase reference pulse activates phase detector 7a and the quadrature reference pulse is used to activate phase detector 7b, wherein the spectral component fed into each of detectors 7a and 7b is converted into phase quadrature components at the output of each respective detector. Phase detectors 7a and 7b can be any standard detector circuit such as chopper amplifiers described in "Transistor Circuit Design" by Texas Instruments, Inc., 1963. The outputs of phase detectors 7a and 7b are DC error levels, and as stated above, are in phase quadrature with each other.

The outputs from phase detectors 7a and 7b are respectively fed into integrators 8a and 8b where the DC error levels are accumulated (integrated) such that phase quadrature error signals are produced at the output of integrators 8a and 8b. Integrators 8a and 8b may be standard Miller integrator or sweep circuits described in "Vacuum Tube and Semiconductor Electronics" by Millman, McGraw Hill, 1958.

The phase quadrature error (ramp or sweep) signals from the output of detectors 8a and 8b are respectively fed into multipliers 9a and 9b. The in-phase reference pulse and the quadrature reference pulse are also respectively applied to multipliers 9a and 9b. The output of multiplier 9a is equal to the in-phase reference pulse multiplied by a factor which varies between 0 and 1, the multiplication factor being determined by the error signal produced by integrator 8a. The output from multiplier 9b is likewise equal to the quadrature reference pulse multiplied by a factor which varies between 0 and 1, said factor being determined by the error signal from the output of integrator 8b. It should be noted that if the spectral component fed into detectors 7a and 7b is completely in phase with the in-phase reference pulse, the multiplication factor at multiplier 9a would be 1 and the multiplication factor at multiplier 9b would be 0, and likewise if the spectral component would be in phase with the quadrature reference pulse, the multiplication factor at multiplier 9a would be 0 and the multiplication factor at multiplier 9b would be 1. Multipliers 9a and 9b can be standard quadrant multiplier components consisting of diodes and passive elements, such quadrant multipliers being commercially available from companies such as Motorola.

The multiplied in-phase reference pulse from the output of multiplier 9a and the multiplied quadrature reference pulse from the output of multiplier 9b is fed into adder 10. Adder 10 can be typically a resistive network wherein the sum of the multiplied in-phase reference pulse results in the final blocking pulse produced at the output of said adder 10. The blocking pulse is then subtracted from the input signal by passing the blocking pulse through inverter 3 and adding the inverted blocking pulse to the input signal at adder 2.

The remaining portion of the input signal at the output of adder 2 is then again coupled back to band pass filter 4. This time the output of band pass filter 4 represents the unsuppressed portion of the spectral component of the signal. This unsuppressed portion is again fed into phase detectors 7a and 7b and any DC error level detected at the output of the respective detectors 7a and 7b is fed into integrators 8a and 8b so as to further accumulate or adjust the phase quadrature error signals at the output of integrators 8a and 8b. These adjusted phase quadrature error signals adjust the multiplication factors at multipliers 9a and 9b so that the blocking pulse at the output of adder 10 more closely represents in amplitude and phase the spectral component of the input signal to be suppressed. The circuit will finally stabilize when the DC error levels at the output of phase detectors 7a and 7b are sufficiently negligible so as to no longer change the quadrature error signals at the output of integrators 8a and 8b, thus stabilizing the multiplication factor at multipliers 9a and 9b so as to produce the final blocking pulse at the output of adder 10. The output from adder 2 is the input signal minus the spectral component and can be transmitted as desired.

It should be noted that the subtraction network 1 could alternatively be represented by a differential amplifier circuit.

While I have described above the principles of my invention in connection with specific apparatus, it is to be clearly understood that this description is made only by way of example and not as a limitation to the scope of my invention as set forth in the objects thereof and in the accompanying claims.

I claim:

1. Apparatus for suppressing a phase-sensitive spectral component from a signal comprising:

means for filtering said phase-sensitive spectral component from said signal;

means for generating first and second reference pulses at the frequency of said spectral component, said second reference pulse being in phase quadrature with said first reference pulse;

means coupled to said first and second reference pulses and said filtered spectral component for converting said filtered spectral component into respective first and second phase quadrature error signals;

first and second means coupled to said first and second reference pulses, respectively, and to said respective first and second phase quadrature error signal for multiplying the respective first and second reference pulses by a factor varying between 0 and 1, the factor of each of said first and second multiplying means being determined by said respective first and second phase quadrature error signals;

means coupled to the multiplied first and second reference pulses for summing the multiplied first and second reference pulses to obtain said blocking pulse at the frequency of said spectral component;

means coupled to said blocking pulse and input signal for subtracting said blocking pulse from said signal; and means for coupling the remainder of said signal to said filtering means, so as to readjust the amplitude and phase of said blocking pulse in order to more completely eliminate said spectral component from said signal.

2. Apparatus according to claim 1, wherein said converting means further comprises:

first and second synchronous detectors coupled to the output of said filtering means, said first reference pulse activating said first synchronous detector, said second reference pulse activating said second synchronous detector, whereby the outputs of each of said detectors are DC error levels in phase quadrature with each other; and first and second accumulator means coupled to the respective outputs of said first and second synchronous detectors for cumulatively producing said respective first and second phase quadrature error signals at the respective outputs of said first and second accumulator means.

3. Apparatus according to claim 2, wherein said first and second accumulator means are integrators.

4. A method of suppressing a phase-sensitive spectral sensitive component from a signal comprising the steps of:

filtering said phase-sensitive spectral component from said signal;

generating first and second reference pulses at the frequency of said spectral component, said second reference pulse being in phase quadrature with said first reference pulse;

converting said filtered spectral component into respective first and second phase quadrature error signals;

multiplying the respective first and second reference pulses by a factor varying between 0 and 1, the multiplying factor for each of said first and second reference pulses being determined by said respective first and second phase quadrature error signals;

summing the multiplied first and second reference pulses to obtain said blocking pulse at the frequency of said spectral component;

subtracting said blocking pulse from said signal; and readjusting the phase and amplitude of said blocking pulse with the use of the unsuppressed portion of said spectral component so as to more completely eliminate said spectral component from said signal.

* * * * *